United States Patent
Zhang et al.

(10) Patent No.: US 8,184,936 B2
(45) Date of Patent: May 22, 2012

(54) MULTI-MODE BENDING-RESISTANT FIBER AND PRODUCTION METHOD THEREOF

(75) Inventors: Fanghai Zhang, Wuhan (CN); Beibei Cao, Wuhan (CN); Qingrong Han, Wuhan (CN); Raadjkoemar Matai, Wuhan (NL)

(73) Assignee: Yangtze Optical Fibre and Cable Company, Ltd., Wuhan (CN)

( * ) Notice: Subject to any disclaimer, the term of this patent is extended or adjusted under 35 U.S.C. 154(b) by 114 days.

(21) Appl. No.: 12/839,396

(22) Filed: Jul. 19, 2010

(65) Prior Publication Data

US 2011/0044596 A1    Feb. 24, 2011

Related U.S. Application Data

(63) Continuation of application No. PCT/CN2010/070778, filed on Feb. 26, 2010.

(30) Foreign Application Priority Data

Aug. 18, 2009 (CN) .......................... 2009 1 0063643

(51) Int. Cl.
*G02B 6/28* (2006.01)
*G02B 6/02* (2006.01)
(52) U.S. Cl. .................. 385/124; 385/122; 385/123
(58) Field of Classification Search .......... 385/122–124; 65/385, 397
See application file for complete search history.

(56) References Cited

U.S. PATENT DOCUMENTS

| | | | |
|---|---|---|---|
| 7,570,856 B1 * | 8/2009 | Minelly et al. | 385/126 |
| 7,787,731 B2 * | 8/2010 | Bookbinder et al. | 385/124 |
| 2010/0272406 A1 * | 10/2010 | Bookbinder et al. | 385/124 |

* cited by examiner

*Primary Examiner* — Brian M. Healy
*Assistant Examiner* — Guy Anderson
(74) *Attorney, Agent, or Firm* — Matthias Scholl P.C.; Matthias Scholl

(57) ABSTRACT

A multimode fiber including a core and a cladding. The core has a radius (R1) of 24-26 μm, the refractive index profile thereof is a parabola, and the maximum relative refractive index difference (Δ1) is 0.9-1.1%. The cladding surrounds the core and includes from inside to outside an inner cladding, a middle cladding, and an outer cladding; a radius (R2) of the inner cladding is 1.04-1.6 times that of the core, and a relative refractive index difference (Δ2) thereof is −0.01-0.01%; the middle cladding is a graded refractive index cladding whose radius (R3) is 1.06-1.8 times that of the core, and a relative refractive index difference thereof is decreased from Δ2 to Δ4; and a radius (R4) of the outer cladding is 2.38-2.63 times that of the core, and a relative refractive index difference (Δ4) thereof is between −0.20 and −0.40%. The invention reduces the additional bending loss of the fiber, improves the bending resistance and mechanical properties, basically eliminates the internal stress, and ensures the service life even working for a long term under the condition of low radius. The method for producing the fiber is simple, effective, and suitable for mass production.

12 Claims, 3 Drawing Sheets

MULTI-MODE BENDING-RESISTANT FIBER AND PRODUCTION METHOD THEREOF

CROSS-REFERENCE TO RELATED APPLICATIONS

This application is a continuation of International Patent Application No. PCT/CN2010/070778 with an international filing date of Feb. 26, 2010, designating the United States, now pending, and further claims priority benefits to Chinese Patent Application No. 200910063643.X filed Aug. 18, 2009. The contents of all of the aforementioned applications, including any intervening amendments thereto, are incorporated herein by reference.

BACKGROUND OF THE INVENTION

1. Field of the Invention

The invention relates to the field of optical communication, and more particularly to a multimode fiber suitable for access network or miniaturized optical apparatus, as well as to a method for producing the same. The fiber has excellent bending resistance.

2. Description of the Related Art

Multimode fibers, particularly those with high bandwidth, e.g., OM3, are widely used in short-medium distance optical fiber network system (such as data centers and campus networks) due to low cost of system construction. When used in indoor and narrow environments, particularly in a small storage box, fibers are exposed to great bending stress. Thus, to meet the requirements of the network construction and apparatus miniaturization, bending resistant multimode fibers are desired. In comparison with conventional multimode fibers, bending resistant multimode fibers are desired to possess the following properties. First, low additional bending loss, particularly, low additional macro-bend loss. The multimode fibers have a plurality of transmission mode, and high order mode transmitted close to the edge of the core is easily leaked out upon fiber bending. When the bending radius decreases, more photons are leaked out, and the system attenuation increases, thereby resulting in signal distortion and system error. Second, the service life of the multimode fiber should not be affected under low bending radius. Bending resistant multimode fibers may work at low bending radius for a long term. When the fiber bends, the outside thereof is exposed to tensile stress. The tensile stress is represented by the following formula:

$$\sigma = \frac{E \cdot r}{(R + C_{th} + r)}$$

wherein E represents young modulus of silica glass, R represents a bending radius, r represents the radius of a fiber, and $C_{th}$ represents the thickness of a coating. For a fiber with a glass cladding diameter of 125 μm and an outer diameter of 250 μm, when the bending radius is decreased to 6.5 mm, the tensile stress imposed on the outer bending wall of the fiber is 0.69 GPa (100 kpsi), which reaches the common screening tension of fibers. Bending easily causes fracture, thereby increasing the building and maintenance cost and affects the reliability of the systems in the application of FTTx. Thus, bending resistant multimode fibers must have good mechanical properties so as to possess long service life under low bending radius. Compared with common multimode fibers, bending resistant multimode fibers should have smaller residual stress and fewer defects. Third, bending resistant multimode fibers should have high bandwidth so as to meet the transmission requirement of 10 Gb/s or even 40 Gb/s ethernet.

An effective method to improve bending properties of fibers is to design a depressed cladding, whose refractive index profile is a trench-type (as shown in FIG. 1) or a double cladding type (as shown in FIG. 2). The method is disclosed in US20080166094A1, US20090169163A1, and US20090154888A1. The principle is that when the fiber bends slightly, the photons leaked from the core are restricted in the inner cladding to a large extent and finally return to the core, and thereby the macro-bend loss decreases greatly.

How to ensure long service life of a fiber working for a long term at low bending radius is an urgent problem to be solved. The fiber whose refractive index profile is shown in FIG. 1 has a highly germanium doped core and a highly fluorine doped depressed cladding. The core and the depressed cladding are close to each other. The coefficient of expansion of silica glass doped with germanium is significantly different from that doped with fluorine. Thus, internal stress is produced inside the fiber. Although the additional bending loss caused by the internal stress can be solved by designing a depressed cladding, the service life of the fiber has been affected badly. In addition, when fiber bending, the internal stress causes the profile to distort, which affects the transmission bandwidth. The fiber whose refractive index profile is shown in FIG. 2 has the same the material composition as disclosed in the above mentioned US patents, but just like the fiber whose refractive index profile is shown in FIG. 1, the internal stress is still produced. The internal stress is originated from different thermal expansion coefficient of different layers. Thus, it is a permanent stress and hardly removed by improving the process, but can be removed by designing appropriate material composition and structure. The appendix of fiber standard ITU-TG.657 briefly describes the prediction of fiber life. The service life of fibers is related to the dynamic fatigue parameters (nd) thereof. Under identical bending radius and storage length, the higher the dynamic fatigue parameters of fibers, the higher the mechanical reliability thereof. Thus, the effect of upgrading the material composition and profile structure of the fiber can be determined by testing the dynamic fatigue parameters thereof.

To make a multimode fiber have good bandwidth, the refractive index profile thereof should be a close-to-perfection parabola. Some literatures including Chinese Patent No. 1183049C disclose methods for producing a preform with accurate refractive index distribution. However, in the process of fiber drawing, due to residual stress and the diffusion of compositions, the refractive index distribution of the resultant fiber may distort. That is to say, even if the refractive index distribution of a preform is a perfect parabola, that of a fiber drawn therefrom is not necessarily a perfect parabola.

SUMMARY OF THE INVENTION

To describe the invention, technical terms involved are defined as below:

"Mandrel" refers to a preform comprising a core and some claddings coated thereon.

"Radius" refers to a distance between the outer boundary of a layer and a central point.

"Refractive index profile" refers to the relation between the glass refractive index of a fiber or a preform (such as a mandrel) and the radius thereof.

"Relative refractive index difference" is defined by the following formula:

$$\Delta\% = [(n_i^2 - n_0^2)/2n_i^2] \times 100\% \approx \frac{n_i - n_0}{n_0} \times 100\%,$$

wherein $n_i$ and $n_0$ represent the refractive index of a material and pure silica glass, respectively, and $n_i$ represents the maximum refractive index unless stated otherwise.

"The contribution of fluoride" refers to the relative refractive index difference ($\Delta_F$) between a fluoride-doped silica glass and a pure silica glass, representing the addition amount of fluoride.

"The contribution of germanium" refers to the relative refractive index difference ($\Delta_{Ge}$) between a germanium-doped silica glass and a pure silica glass, representing the addition amount of germanium.

"Casing tube" refers to a pure silica glass tube with appropriate geometry structure and cross-sectional area.

"RIT process" refers to inserting a mandrel into a casing tube to form a preform.

"Exponential refractive index profile" refers to a refractive index profile represented by the following formula:

$$n^2(r) = n_1^2 \left[1 - 2\Delta\left(\frac{r}{a}\right)^\alpha\right]_{r<a},$$

wherein $n_1$ represents the refractive index of the core of a fiber, r represents a distance reaching the axis of the fiber, a represents the radius of the fiber, α represents a distribution index, and Δ represents a relative refractive index difference of the core/the cladding.

In view of the above-described problems, it is objectives of the invention to provide a multimode fiber that features a practicable structure, high mechanical reliability, long service life, good bending resistance, and high bandwidth, as well as to provide a method for producing the same.

To achieve the above objectives, in accordance with one embodiment of the invention, there is provided a multimode fiber, comprising: a core and a cladding, wherein the core has a radius (R1) of 24-26 μm, the refractive index profile thereof is a parabola (α=1.9-2.2), and the maximum relative refractive index difference (Δ1) is 0.9-1.1%; the cladding surrounds the core and comprises from inside to outside an inner cladding, a middle cladding, and an outer cladding; a radius (R2) of the inner cladding is 1.04-1.6 times that of the core, and a relative refractive index difference (Δ2) thereof is −0.01-0.01%; the middle cladding is a graded refractive index cladding whose radius (R3) is 1.06-1.8 times that of the core, and a relative refractive index difference thereof is decreased from Δ2 to Δ4; and a radius (R4) of the outer cladding is 2.38-2.63 times that of the core, and a relative refractive index difference (Δ4) thereof is between −0.20 and −0.40%.

In a class of this embodiment, the radius (R2) of the inner cladding is 1.04-1.25 times that of the core.

In a class of this embodiment, the relative refractive index difference (Δ4) of the outer cladding is constant, on the increase, or on the decrease gradually along the radial direction from inside to outside, and preferably, on the increase.

In a class of this embodiment, the relative refractive index difference (Δ4) of the outer cladding is on the increase from inside to outside, from −0.40% to −0.25%, or from −0.35% to −0.15%.

In a class of this embodiment, the relative refractive index difference (Δ4) of the outer cladding is on the decrease from inside to outside, from −0.15% to −0.35%, or from −0.10% to −0.30%.

In a class of this embodiment, the doping profile of the fiber is shown in FIG. 6, and the core comprises silica glass doped with germanium and fluorine, with the contribution of fluoride ($\Delta_F$) of −0.03±0.02%; the inner cladding comprises silica glass doped with germanium and fluorine, and the amount of doped fluorine and germanium is on the increase gradually from the outer interface 32 to the inner interface 21, exhibiting a gradient change; the middle cladding comprises silica glass doped with fluorine, and the amount of doped fluorine is on the increase gradually from the inner interface 32 to the outer interface 43; and the outer cladding comprises silica glass doped with fluorine.

In a class of this embodiment, the material composition of the silica glass doped with germanium and fluorine is $SiO_2$—$GeO_2$—F—Cl, and that of the silica glass doped with fluorine is $SiO_2$—F—Cl.

In a class of this embodiment, the introduced chlorine originates from the reaction between silicon tetrachloride ($SiCl_4$) and/or germanium tetrachloride ($GeCl_4$) and oxygen. The fluctuation of chlorine content has little influence on the properties of the fiber. Actually, the chlorine content has little fluctuation under stable process conditions. Thus, there is no need of specific control and requirement on the chlorine content.

A method for producing a multimode fiber comprises the steps of: a) fixing a pure silica glass liner tube in a plasma enhanced chemical vapor deposition (PCVD) lathe; b) in the presence of silicon tetrachloride and oxygen, aerating a fluorine-containing gas to dope fluorine and germanium tetrachloride to dope germanium; c) ionizing the gas in the liner tube with microwave into plasma and depositing the plasma in the form of glass on the inner wall of the liner tube; d) altering the doped gas flow according to the doping requirements of optical waveguide structure and depositing a middle cladding, an inner cladding, and a core in sequence; e) melting a resultant depositing tube into a solid mandrel with a furnace; f) corroding the solid mandrel with hydrofluoric acid so as to remove the linter tube; g) preparing a fiber preform using RIT process with fluorine-doped silica glass as a casing tube, or using OVD or VAD process by depositing an outer cladding surrounding the solid mandrel; h) drawing the fiber preform in a fiber drawing tower with a tension of 0.2-0.4 N to yield a fiber and coating two layers of UV-cured acrylic resin polymer on the surface of the fiber.

In a class of this embodiment, the fluorine-containing gas is $C_2F_6$, $CF_4$, $SiF_4$, $SF_6$, or a mixture thereof.

To produce a multimode fiber with accurate refractive index distribution, in the process of preparing a preform, the refractive index distribution of the fiber and of the preform is compared. Based on the comparison, the refractive index distribution of the preform is amended and compensated so as to produce a multimode fiber with accurate refractive index distribution. A method for amending and compensating the refractive index distribution of a preform comprises the steps of:

a) designing a refractive index distribution of a fiber preform according to a refractive index distribution of a multimode fiber;

b) adjusting the composition of a gas mixture and supply rate thereof used for preparing the preform so as to match the designed refractive index distribution;

c) introducing the gas mixture into a liner tube to deposit a glass oxide and form the preform;

d) measuring the refractive index distribution of the preform and drawing the preform into a fiber;

e) measuring the refractive index distribution of the fiber;

f) comparing the measured refractive index distribution with an expected refractive index distribution of the fiber, and amending the refractive index distribution of the preform if the contrast difference exceeds the tolerance range;

g) altering the relation of the composition of the gas mixture and the reaction time in the subsequent deposition process so as to amend the refractive index distribution of the preform; and h) repeating the steps from c) to g) until the contrast difference of the step f) is within the tolerance range.

In a class of this embodiment, to improve the measurement accuracy of the refractive index distribution of steps d) and e), the measurement is carried out in a plurality of vertical positions and from a plurality of angles (at least the directions X and Y), and the mean of the measured value is practical.

The fiber of the invention has a dynamic fatigue parameter (nd) exceeding 27, a bandwidth exceeding 2,000 or even 5,000 MHz-km at 850 nm, a numerical aperture of 0.195-0.230. At 850 nm, an additional bending loss of the fiber surrounding a 10 mm bending radius once is less than 0.2 dB or even equal to 0.03 dB; an additional bending loss of the fiber surrounding a 7.5 mm bending radius once is less than 0.3 dB or even equal to 0.05 dB; an additional bending loss of the fiber surrounding a 5 mm bending radius once is less than 1.0 dB or even equal to 0.3 dB.

Advantages of the invention are summarized below: 1) the multimode fiber of the invention comprises three claddings, i.e., the inner cladding, the middling cladding with graded refractive index, and the outer cladding, and the material composition and waveguide structure are practicable, which reduces the additional bending loss, improves the bending resistance and mechanical properties, basically eliminates the internal stress, and ensures the service life even working for a long term under the condition of low radius; 2) the fiber comprises a functionally graded material composition and structure, i.e., from the core to the outer interface of the inner cladding, the viscosity varies gradually; in the inner cladding, from outside to inside, the fluorine and germanium doping are on the increase gradually, exhibiting a gradient change, resulting in an increasing coefficient of expansion; the middle cladding makes a smooth transition of the refractive index and viscosity from the inner cladding to the outer cladding; the refractive index of the outer cladding is preferably on the increase from inside to outside, i.e., the fluorine doping decreases but the viscosity increases gradually, which is conducive to the outer cladding for bearing more tension in the process of fiber drawing and decreases the influence of fiber drawing on the core; furthermore, the material composition prevents the generation of residual tension in the process of fiber drawing, which improves the mechanical properties; 3) the invention amends and compensates the refractive index of the preform, the tolerance of the refractive index of the fiber is controlled in a narrow range, and thus, the bandwidth thereof has been improved greatly; and 4) the method for producing the fiber is simple, effective, and very suitable for mass production.

DETAILED DESCRIPTION OF THE EMBODIMENTS

Figure 1:
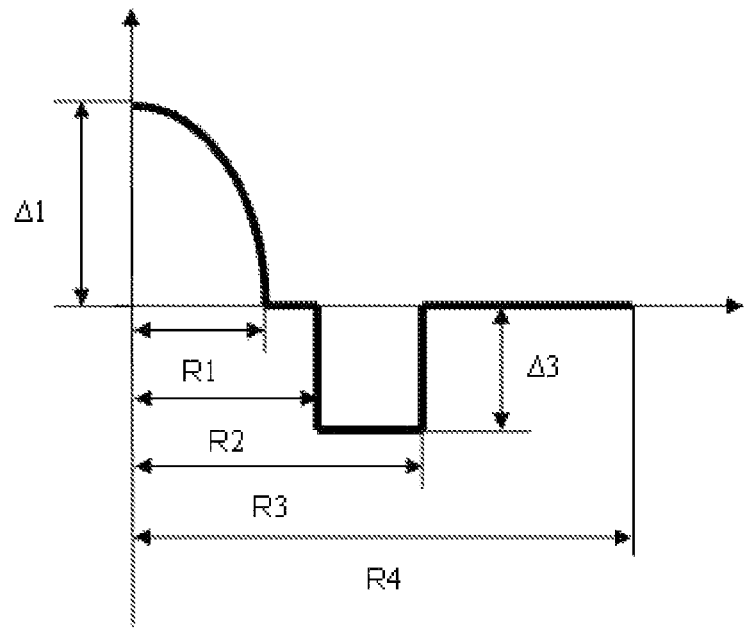
FIG. 1 is a schematic diagram of a refractive index profile of a fiber with a trench-type depressed cladding in the prior art.

Experiments for further illustrating the invention are described below.

EXAMPLE 1

Following the method of the invention, a preform is prepared and drawn, with two layers coated and a drawing speed of 600 m/min, to yield a multimode fiber whose structure and material composition are shown in Table 1. The main performance parameters of the fiber are listed in Table 2.

TABLE 1

Structure and material composition of a multimode fiber

| | Core | | | | Inner cladding | | |
|---|---|---|---|---|---|---|---|
| No. | R1 (μm) | Relative refractive index difference $\Delta_1$ (%) | α | The contribution of fluorine $\Delta_F$ (%) | R2 (μm) | Relative refractive index difference $\Delta_2$ (%) | The contribution of fluorine at the interface 21 $\Delta_F$ (%) | The contribution of fluorine at the interface 32 $\Delta_F$ (%) |
| 1 | 25 | 1.10 | 2.03 | −0.03 | 26 | −0.005 | −0.03 | −0.006 |
| 2 | 24.8 | 1.09 | 2.04 | −0.02 | 27 | −0.002 | −0.02 | −0.002 |
| 3 | 24.2 | 1.03 | 2.03 | −0.04 | 29 | −0.001 | −0.03 | −0.001 |
| 4 | 24 | 1.0 | 2.02 | −0.03 | 31 | 0.001 | −0.03 | 0 |
| 5 | 24.5 | 0.9 | 2.03 | −0.02 | 35 | 0.003 | −0.02 | 0 |
| 6 | 25.2 | 0.96 | 2.12 | −0.03 | 38 | 0.002 | −0.03 | −0.001 |
| 7 | 25.4 | 1.04 | 2.08 | −0.04 | 26 | −0.002 | −0.04 | −0.003 |
| 8 | 25.8 | 0.90 | 2.05 | −0.03 | 27 | −0.007 | −0.03 | −0.008 |

TABLE 1-continued

Structure and material composition of a multimode fiber

| 9  | 24.8 | 0.94 | 2.01 | −0.01 | 29 | −0.004 | −0.01 | −0.005 |
| 10 | 25.1 | 1.06 | 2.02 | −0.05 | 33 | −0.002 | −0.05 | −0.002 |
| 11 | 24.2 | 1.02 | 2.04 | −0.03 | 37 | 0.006  | −0.03 | 0      |

| | Graded index cladding | | Outer cladding | | |
|---|---|---|---|---|---|
| No. | R3 (μm) | The contribution of fluorine at the interface 43 $\Delta_F$ (%) | R4 (μm) | Refractive index is constant or changed gradually? | The contribution of fluorine at the interface 54 $\Delta_F$ (%) |
| 1  | 26.5 | −0.35 | 62.5 | changed gradually | −0.15 |
| 2  | 31   | −0.10 | 62.0 | changed gradually | −0.40 |
| 3  | 32   | −0.30 | 62.4 | changed gradually | −0.20 |
| 4  | 33   | −0.20 | 62.6 | constant          | −0.20 |
| 5  | 36   | −0.25 | 62.8 | constant          | −0.25 |
| 6  | 40   | −0.15 | 62.9 | changed gradually | −0.32 |
| 7  | 27   | −0.25 | 62.0 | constant          | −0.25 |
| 8  | 32   | −0.20 | 63.0 | constant          | −0.20 |
| 9  | 31   | −0.30 | 62.4 | changed gradually | −0.20 |
| 10 | 37   | −0.35 | 62.3 | changed gradually | −0.15 |
| 11 | 39   | −0.40 | 62.7 | changed gradually | −0.10 |

TABLE 2

Main performance parameters of a multimode fiber

| No. | Attenuation at 850 nm (dB/km) | Attenuation at 1300 nm (dB/km) | Full injection bandwidth at 850 nm (MHz-km) | Numerical aperture | Full injection bandwidth at 1300 nm (MHz-km) |
|---|---|---|---|---|---|
| 1  | 2.21 | 0.42 | 11425 | 0.220 | 863 |
| 2  | 2.20 | 0.41 | 7260  | 0.223 | 654 |
| 3  | 2.16 | 0.40 | 4102  | 0.212 | 580 |
| 4  | 2.14 | 0.40 | 3465  | 0.204 | 624 |
| 5  | 2.12 | 0.41 | 2851  | 0.199 | 438 |
| 6  | 2.14 | 0.40 | 3218  | 0.207 | 524 |
| 7  | 2.16 | 0.41 | 4312  | 0.211 | 629 |
| 8  | 2.12 | 0.40 | 9735  | 0.195 | 785 |
| 9  | 2.13 | 0.41 | 4130  | 0.205 | 587 |
| 10 | 2.19 | 0.41 | 2084  | 0.217 | 415 |
| 11 | 2.15 | 0.40 | 3815  | 0.215 | 651 |

| No. | Additional bending loss of the fiber surrounding a 10 mm bending radius once at 850 nm (dB) | Additional bending loss of the fiber surrounding a 7.5 mm bending radius once at 850 nm (dB) | Additional bending loss of the fiber surrounding a 5 mm bending radius once at 850 nm (dB) | Dynamic fatigue parameter |
|---|---|---|---|---|
| 1  | 0.04 | 0.05 | 0.4 | 30.5 |
| 2  | 0.03 | 0.05 | 0.3 | 28.2 |
| 3  | 0.04 | 0.07 | 0.4 | 29.1 |
| 4  | 0.07 | 0.10 | 0.7 | 27.4 |
| 5  | 0.08 | 0.12 | 0.8 | 28.3 |
| 6  | 0.07 | 0.09 | 0.8 | 29.5 |
| 7  | 0.05 | 0.07 | 0.6 | 28.2 |
| 8  | 0.09 | 0.15 | 0.9 | 29.5 |
| 9  | 0.08 | 0.14 | 0.8 | 29.0 |
| 10 | 0.04 | 0.08 | 0.5 | 28.1 |
| 11 | 0.06 | 0.11 | 0.7 | 29.2 |

The additional macro-bend loss is tested following the method of FOTP-62 (IEC 60793-1-47). The fiber to be tested is coiled into a circle with a diameter (for example, 10 mm, 15 mm, 20 mm, 30 mm, etc.), and then the circle is loosened. The optical power before and after coiling is tested. The change value is considered as the additional macro-bend loss of the fiber. The test is carried out under an injection condition of encircled light flux. The condition is obtained as follows. To a front end of a fiber to be tested, a common multimode fiber with a length of 2 meters and a core diameter of 50 μm is melted and linked. The middle of the multimode fiber is surrounded with a circle with a diameter of 25 mm. When a light is injected into the multimode fiber fully, the fiber to be tested is also injected with an encircled light flux.

The full injection bandwidth is measured following the method of FOTP-204, and the full injection condition is satisfied.

To assess the mechanical properties of the fiber accurately, following IEC60793-1-33, the dynamic fatigue parameter (nd) thereof is determined using two point bend test.

EXAMPLE 2

The example relates to amending and compensating the refractive index distribution of a preform according to the refractive index distribution of a fiber, so that a multimode fiber with accurate refractive index distribution is produced.

Based on a preliminarily-designed refractive index distribution of a preform of a multimode fiber, gaseous state of $SiCl_4$, $GeCl_4$, $C_2F_6$, and $O_2$ are introduced into a silica glass liner tube and deposited using PCVD process. The supply amount of $SiCl_4$, $GeCl_4$, and $O_2$ varies with the reaction time as needed, and that of $C_2F_6$ is constant. The resultant deposition tube is melted into a solid mandrel which is further prepared into a preform. The refractive index distribution of the preform is measured and the preform itself is drawn to form a fiber. The refractive index distribution of the fiber is measured. The measurement result is compared with an expected refractive index distribution of the fiber. A distribution parameter α is used to represent the refractive index distribution. If α has a big deviation, the preliminarily-designed refractive index distribution of the preform needs amending. That is to say, to alter the relation of the composition of the gas mixture and the reaction time in the subsequent deposition process so as to amend the refractive index distribution of the preform. Following the method, the standard deviation of the distribution parameter α of the fiber decreases from 0.05 to 0.008.

EXAMPLE 3

To show the effect of the invention, a fiber with the same profile structure and material composition as described in the above-mentioned US patents is produced using PCVD process. The dynamic fatigue parameter (nd) of the fiber is measured. To prevent the influence of the coatings on the measurement results, all fibers have the same type and dimension of coatings. The drawing speed and drawing tension of the fibers are basically the same.

Test A

A fiber whose refractive index profile is shown in FIG. 1 is prepared using PCVD process and the dynamic fatigue parameter (nd) thereof measured. The preparation process and measurement results are described below.

A pure silica glass liner tube is fixed in a plasma enhanced chemical vapor deposition (PCVD) lathe. A reactive gas consisting of silicon tetrachloride and oxygen in the liner tube is ionized with microwave into plasma and finally deposited in the form of glass on the inner wall of the liner tube. According to the doping requirements of optical waveguide structure as shown in FIG. 1, the doped gas flow is altered and a depressed cladding, an inner cladding, and a core are deposited in sequence. Upon depositing the depressed cladding, a fluorine-containing gas is aerated to dope fluorine. The inner cladding is pure silica glass. Upon depositing the core, germanium tetrachloride is aerated to dope germanium so as to improve the refractive index. Subsequently, the depositing tube is melted into a solid mandrel with a furnace, and then a fiber preform is prepared with pure silica glass as a casing tube using RIT process. The fiber preform is drawn in a fiber drawing tower with a tension of 0.4 N to yield a fiber. The surface of the fiber is coated with two layers of UV-cured acrylic resin polymer.

The core of the fiber has no fluorine doping, and the inner and outer cladding both are pure silica glass.

The parameters of the fiber profile and the dynamic fatigue parameter (nd) are listed in Table 3.

TABLE 3

Profile and dynamic fatigue parameter of conventional "strench-type" fiber

| | No. | | | | |
|---|---|---|---|---|---|
| | 12 | 13 | 14 | 15 | 16 |
| Δ1 (%) | 1.02 | 1.03 | 1.03 | 1.04 | 1.01 |
| R1 (μm) | 25 | 25 | 25 | 25 | 25 |
| α | 2.04 | 2.03 | 2.06 | 2.08 | 2.05 |
| Δ2 (%) | 0 | 0 | 0 | 0 | 0 |
| R2 (μm) | 25.8 | 26.1 | 26.8 | 26.4 | 26.7 |
| Δ3 (%) | −0.2 | −0.25 | −0.3 | −0.6 | −0.4 |
| R3 (μm) | 29.2 | 29.4 | 29.5 | 29.8 | 29.7 |
| Δ4 (%) | 0 | 0 | 0 | 0 | 0 |
| R4 (μm) | 62.5 | 62.5 | 62.5 | 62.5 | 62.5 |
| nd | 23 | 22 | 23 | 21 | 22 |

Test B

Figure 2:
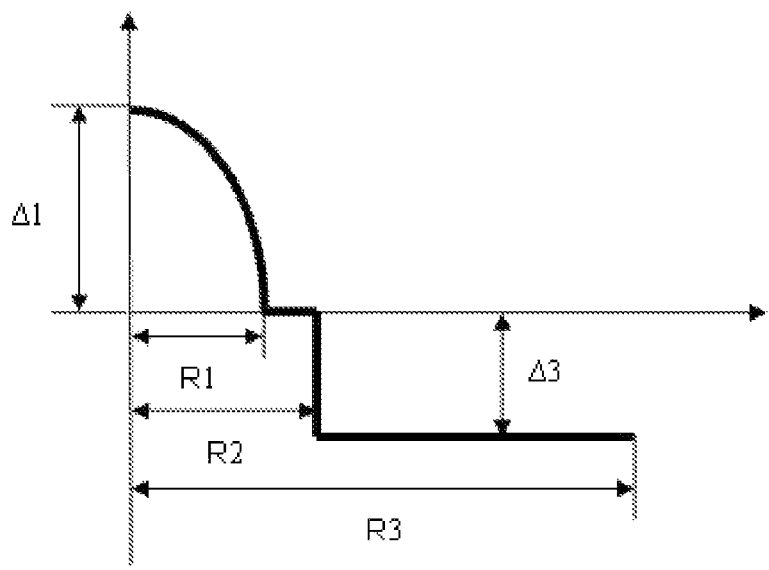
FIG. 2 is a schematic diagram of a refractive index profile of a fiber with a double-cladding-type depressed cladding in the prior art.
Figure 3:
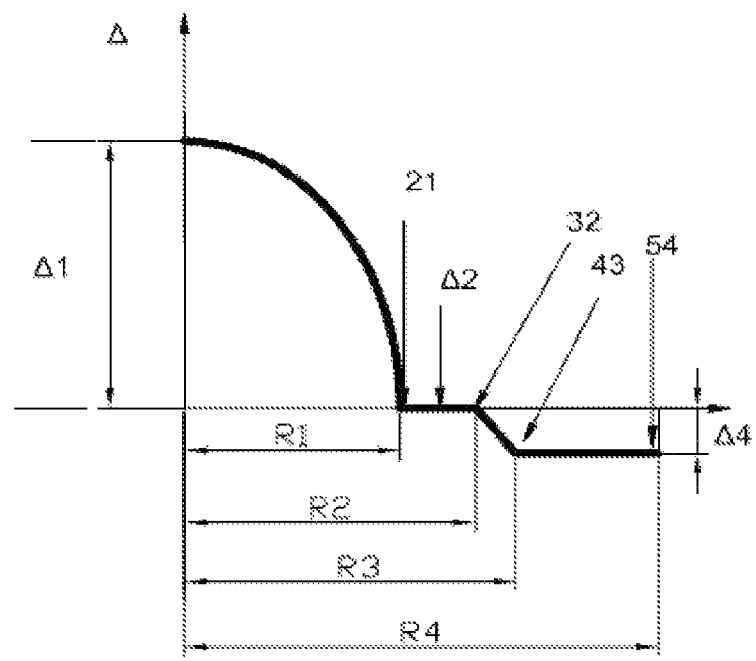
FIG. 3 is a schematic diagram of a refractive index profile of a fiber according to one embodiment of the invention.
Figure 4:
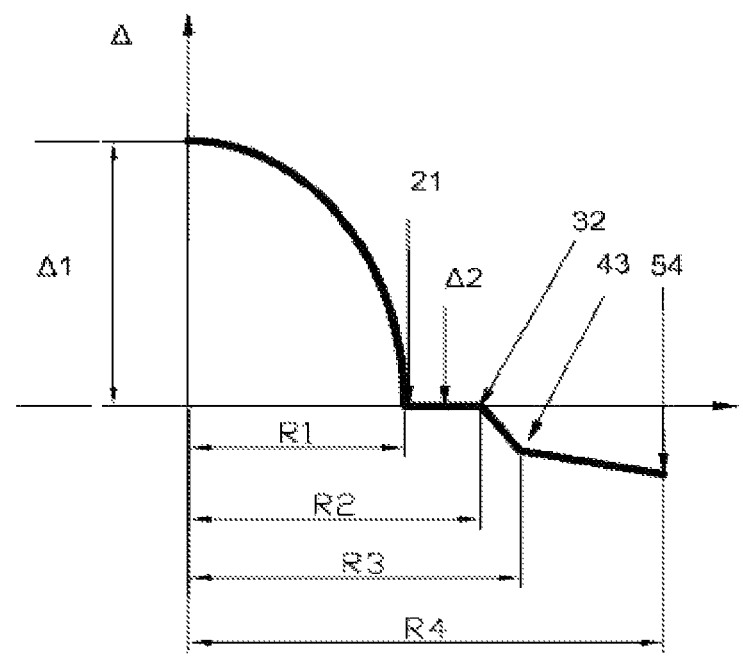
FIG. 4 is a schematic diagram of a refractive index profile of a fiber according to one embodiment of the invention (the fluorine doping of the outer cladding is on the decrease from outside to inside)
Figure 5:
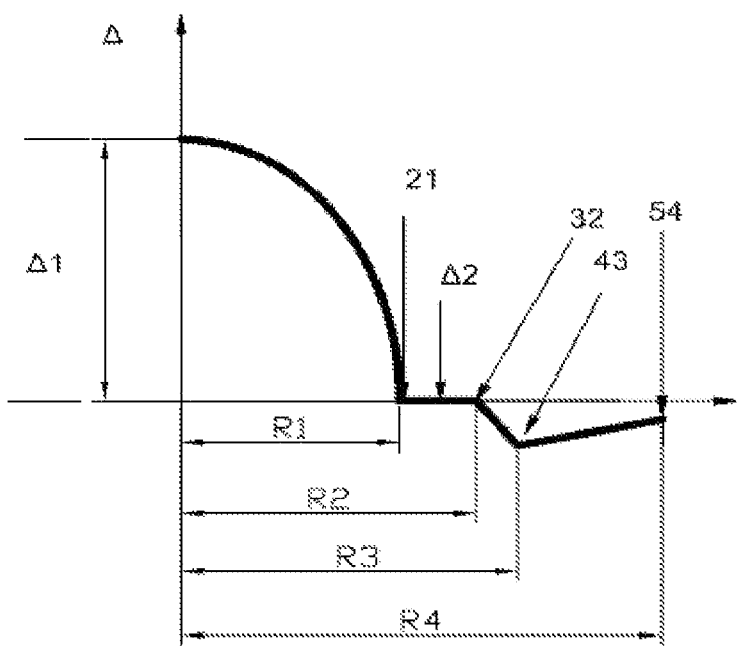
FIG. 5 is a schematic diagram of a refractive index profile of a fiber according to one embodiment of the invention (the fluorine doping of the outer cladding is on the increase from outside to inside)
Figure 6:
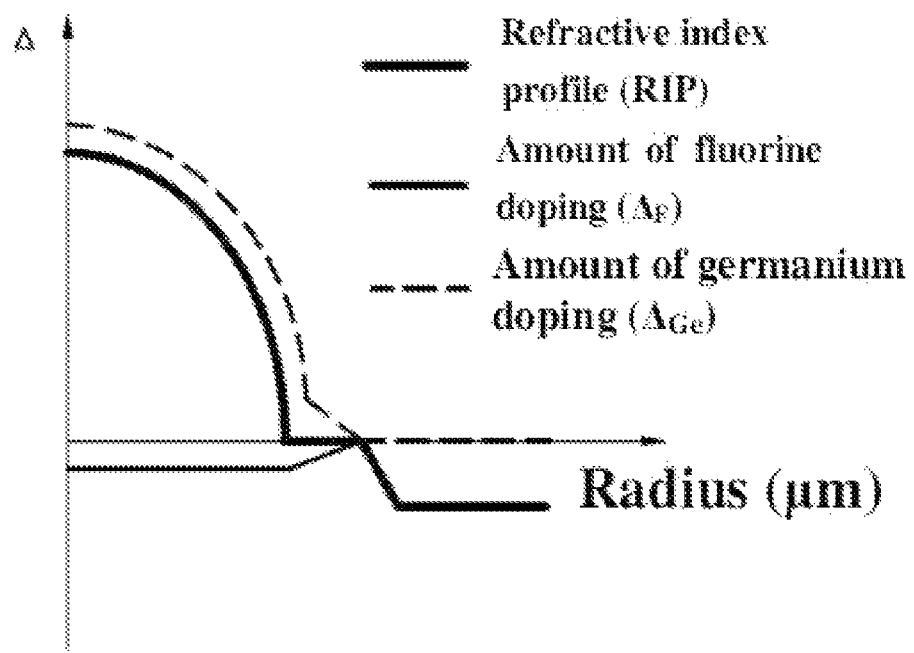
FIG. 6 is a schematic diagram of a doping profile of a fiber according to one embodiment of the invention.

A fiber whose refractive index profile is shown in FIG. 2 is prepared using PCVD process and the dynamic fatigue parameter (nd) thereof measured. The preparation process and measurement results are described below.

A pure silica glass liner tube is fixed in a plasma enhanced chemical vapor deposition (PCVD) lathe. In the presence of silicon tetrachloride and oxygen, germanium tetrachloride is aerated to dope germanium, and the reactive gas in the liner tube is ionized with microwave into plasma and finally deposited in the form of glass on the inner wall of the liner tube. According to the doping requirements of optical waveguide structure as shown in FIG. 2, the doped gas flow is altered and a core is deposited. Subsequently, the depositing tube is melted into a solid mandrel with a furnace. The solid mandrel is corroded with hydrofluoric acid so as to remove the linter tube. A fiber preform is prepared using RIT process with fluorine-doped silica glass as a casing tube. The fiber preform is drawn in a fiber drawing tower with a tension of 0.4 N to yield a fiber. The surface of the fiber is coated with two layers of UV-cured acrylic resin polymer.

The core of the fiber has no fluorine doping.

The parameters of the fiber profile and the dynamic fatigue parameter (nd) are listed in Table 4.

TABLE 4

Profile and dynamic fatigue parameter of conventional "double claddings" fiber

| | No. | | | | |
|---|---|---|---|---|---|
| | 17 | 18 | 19 | 20 | 21 |
| Δ1 (%) | 1.03 | 1.05 | 1.08 | 1.07 | 1.02 |
| R1 (μm) | 25 | 25 | 25 | 25 | 25 |
| α | 2.05 | 2.03 | 2.04 | 2.04 | 2.05 |
| Δ2 (%) | 0 | 0 | 0 | 0 | 0 |
| R2 (μm) | 28 | 30 | 28 | 27 | 29 |
| Δ3 (%) | −0.2 | −0.25 | −0.3 | −0.3 | −0.35 |
| R3 (μm) | 62.5 | 62.5 | 62.5 | 62.5 | 62.5 |
| nd | 23 | 22 | 23 | 22 | 21 |

From the results of Tables 2-4, it is obvious that, with the material composition and profile structure of the invention, the dynamic fatigue parameter (nd) of the fiber has been improved greatly.

The invention claimed is:

1. A bending resistant multimode fiber, comprising a core and a cladding, wherein
said core has a radius (R1) of 24-26 μm, the refractive index profile thereof is a parabola (α=1.9-2.2), and the maximum relative refractive index difference (Δ1) is 0.9-1.1%;

said cladding surrounds said core and comprises from inside to outside an inner cladding, a middle cladding, and an outer cladding;

a radius (R2) of said inner cladding is 1.04-1.6 times that of said core, and a relative refractive index difference (Δ2) thereof is −0.01-0.01%;

said middle cladding is a graded refractive index cladding whose radius (R3) is 1.06-1.8 times that of said core, and a relative refractive index difference thereof is decreased from Δ2 to Δ4; and a radius (R4) of said outer cladding is 2.38-2.63 times that of said core, and a relative refractive index difference (Δ4) thereof is between −0.20 and −0.40%.

2. The bending resistant multimode fiber of claim 1, wherein the radius of said inner cladding is 1.04-1.25 times that of said core.

3. The bending resistant multimode fiber of claim 1, wherein the relative refractive index difference (Δ4) of said outer cladding is constant, on the increase, or on the decrease gradually along the radial direction from inside to outside.

4. The bending resistant multimode fiber of claim 2, wherein the relative refractive index difference (Δ4) of said outer cladding is constant, on the increase, or on the decrease gradually along the radial direction from inside to outside.

5. The bending resistant multimode fiber of claim 3, wherein the relative refractive index difference (Δ4) of said outer cladding is on the increase from inside to outside, from −0.40% to −0.25%, or from −0.35% to −0.15%.

6. The bending resistant multimode fiber of claim 3, wherein the relative refractive index difference (Δ4) of said outer cladding is on the decrease from inside to outside, from −0.15% to −0.35%, or from −0.10% to −0.30%.

7. The bending resistant multimode fiber of claim 1, wherein said core comprises silica glass doped with germanium and fluorine, with the contribution of fluoride ($\Delta_F$) of −0.03±0.02%; said inner cladding comprises silica glass doped with germanium and fluorine, and the amount of doped fluorine and germanium is on the increase gradually from an outer interface (32) to an inner interface (21), exhibiting a gradient change; said middle cladding comprises silica glass doped with fluorine, and the amount of doped fluorine is on the increase gradually from said inner interface (32) to an outer interface (43); and said outer cladding comprises silica glass doped with fluorine.

8. The bending resistant multimode fiber of claim 2, wherein said core comprises silica glass doped with germanium and fluorine, with the contribution of fluoride ($\Delta_F$) of −0.03±0.02%; said inner cladding comprises silica glass doped with germanium and fluorine, and the amount of doped fluorine and germanium is on the increase gradually from an outer interface (32) to an inner interface (21), exhibiting a gradient change; said middle cladding comprises silica glass doped with fluorine, and the amount of doped fluorine is on the increase gradually from an inner interface (32) to an outer interface (43); and said outer cladding comprises silica glass doped with fluorine.

9. The bending resistant multimode fiber of claim 7, wherein the material composition of said silica glass doped with germanium and fluorine is $SiO_2$—$GeO_2$—F—Cl, and that of said silica glass doped with fluorine is $SiO_2$—F—Cl.

10. A method for producing a multimode fiber, comprising the steps of:
   a) fixing a pure silica glass liner tube in a plasma enhanced chemical vapor deposition (PCVD) lathe;
   b) in the presence of silicon tetrachloride and oxygen, aerating a fluorine-containing gas to dope fluorine and germanium tetrachloride to dope germanium;
   c) ionizing the gas in said liner tube with microwave into plasma and depositing said plasma in the form of glass on the inner wall of said liner tube;
   d) altering the doped gas flow according to the doping requirements of optical waveguide structure and depositing a middle cladding, an inner cladding, and a core in sequence;
   e) melting a resultant depositing tube into a solid mandrel with a furnace;
   f) corroding said solid mandrel with hydrofluoric acid so as to remove said linter tube;
   g) preparing a fiber preform using RIT process with fluorine-doped silica glass as a casing tube, or using OVD or VAD process by depositing an outer cladding surrounding said solid mandrel; and
   h) drawing said fiber preform in a fiber drawing tower with a tension of 0.2-0.4 N to yield a fiber and coating two layers of UV-cured acrylic resin polymer on the surface of said fiber.

11. The method of claim 10, wherein said core comprises silica glass doped with germanium and fluorine, with the contribution of fluoride ($\Delta_F$) of −0.03±0.02%; said inner cladding comprises silica glass doped with germanium and fluorine, and the amount of doped fluorine and germanium is on the increase gradually from an outer interface (32) to an inner interface (21), exhibiting a gradient change; said middle cladding comprises silica glass doped with fluorine, and the amount of doped fluorine is on the increase gradually from an inner interface (32) to an outer interface (43); and said outer cladding comprises silica glass doped with fluorine.

12. A method for amending and compensating the refractive index distribution of said preform of claim 10 comprising the steps of:
   a) designing a refractive index distribution of a fiber preform according to a refractive index distribution of a multimode fiber;
   b) adjusting the composition of a gas mixture and supply rate thereof used for preparing said preform so as to match the designed refractive index distribution;
   c) introducing said gas mixture into a liner tube to deposit a glass oxide and form said preform;
   d) measuring the refractive index distribution of said preform and drawing said preform into a fiber;
   e) measuring the refractive index distribution of said fiber;
   f) comparing the measured refractive index distribution with an expected refractive index distribution of said fiber, and amending the refractive index distribution of said preform if the contrast difference exceeds the tolerance range;
   g) altering the relation of the composition of said gas mixture and the reaction time in the subsequent deposition process so as to amend the refractive index distribution of the preform; and
   h) repeating the steps from c) to g) until the contrast difference of the step f) is within a tolerance range.

* * * * *